(No Model.)
G. F. MESSINGER.
HORSESHOE.
No. 318,276. Patented May 19, 1885.
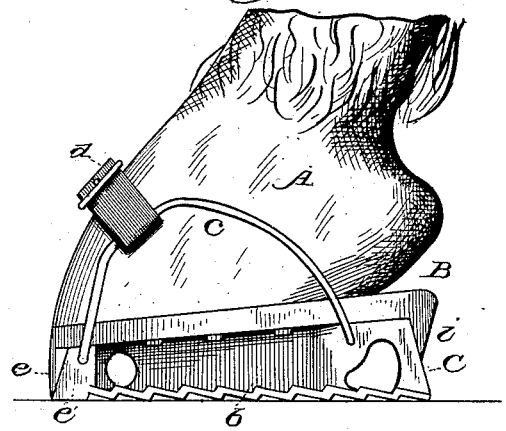
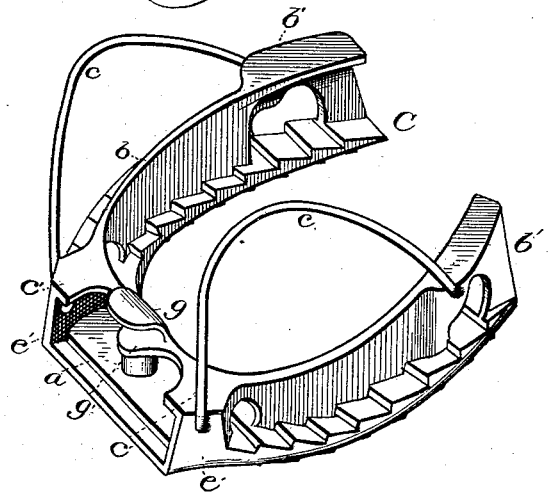
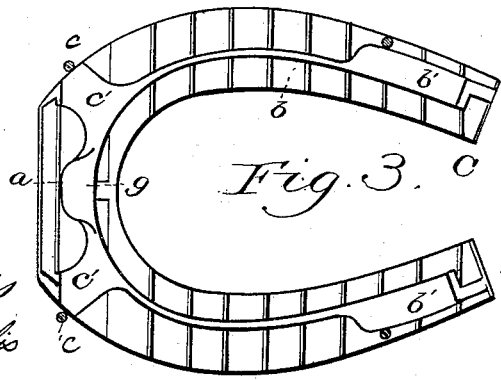
WITNESSES:
INVENTOR
ATTORNEY

UNITED STATES PATENT OFFICE.

G. FRANK MESSINGER, OF STOCKERTOWN, PENNSYLVANIA.

HORSESHOE.

SPECIFICATION forming part of Letters Patent No. 318,276, dated May 19, 1885.

Application filed December 10, 1884. (No model.)

*To all whom it may concern:*

Be it known that I, G. FRANK MESSINGER, of Stockertown, in the county of Northampton and State of Pennsylvania, have invented certain new and useful Improvements in Supplemental Horseshoes; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to supplemental shoes for attachment to the hoof and ordinary shoe of a horse or other animal; and it consists, substantially, in the form of construction and the particular combinations to be hereinafter described, and distinctly pointed out in the claims.

In tread-mills or horse-power mills and the like, where animal-power is employed to operate the working parts, it sometimes happens that the shoes of such animals become caught in the belt-lagging and are torn off or broken, frequently breaking the limb of the animal, tearing or otherwise injuring the hoof, and of necessity greatly retarding the working or operation of the machinery.

My invention has for its object to provide a supplemental shoe that may be attached to the hoof of an animal thus employed, whereby these injurious and disastrous effects are avoided. There have been former inventions for a like purpose; but they are all more or less attended with disadvantages, either in being too clumsy or heavy, or in not being adapted for such a snug fitting to the shoe or hoof as will render no inconvenience to the animal. A supplemental shoe constructed in accordance with my invention possesses the greatest degree of lightness and strength, and in its employment experiences no material hinderance to a full and free action or manipulation of its limbs.

Referring to the accompanying sheet of drawings, Figure 1 represents a view of an animal's hoof, showing the application thereto of a supplemental shoe constructed in accordance with my invention. Fig. 2 represents a perspective view of the supplemental shoe detached, and Fig. 3 represents a top or plan view thereof.

Reference being had to the several parts by the letters marked thereon, A represents an animal's hoof, and B the ordinary shoe worn by such animal.

C represents the supplemental shoe as a whole. $c\ c$ represent spring wire clamps, and $d$ indicates a strap which is passed under the clamps at the opposite sides of the hoof and secured across the front thereof. $e$ represents the front or toe calk, and $i$ the rear or heel calks.

For the purpose of lightness and maximum strength, I have provided the supplemental shoe of skeleton structure, which is briefly described as follows: The base thereof conforms in general contour to the shape of the main shoe B, except at the front, where it is formed straight across. On its under surface it is crimped or corrugated, as shown, by which the feet of the animal will be prevented from slipping on the belt-lagging while it is treading the same. The upper surface is likewise crimped in conformity to the under surface, furnishing increased strength. The upper surface at the straight front portion is rabbeted or flanged, as shown at $a$, to form a recess into which the edge of the front calk, $e$, is received and snugly fits. The sides of the supplemental shoe consist of a continuous web, $b$, which follows the shape of the base and curves slightly outward at the two extremities, against which the heel-calks rest or abut. The top of the web $b$ widens at the extremities, as seen at $b'\ b'$, furnishing thereby a greater bearing. In like manner at the front of the shoe the web widens, as seen at $c'\ c'$, and at these points the sides of the web also extend slightly outward, as seen at $e'\ e'$, thus forming a wall at each side of the toe-calk, which tends to prevent slipping and sidewise displacement of the supplemental shoe. Centrally of the front portion the web is constructed with a curved projection or hook, $g$, which is designed to take into the space between the main shoe and the hoof, to thereby prevent vertical displacement. The construction of this hook is such that at the point $g'$, where it branches off from the web, a sort of base is formed, which goes under the main shoe and assists in maintaining the weight of the animal, and prevents the hook from being forced up into the hoof.

In fitting the supplemental shoe to the ordinary shoe of an animal it is preferable to have the upper edge of the web $b$ as nearly central thereof as possible, and it will be apparent that for lightness and strength the invention possesses many advantages. The extremities are higher than at the front, as is usual in such devices, to compensate for the incline of the lagging-belt, and also counteract the effects of the strain upon the animal's limbs.

The spring-clamps $c\ c$ consist of strong wire having an end secured at the two extremities and at the portions $e'\ e'$. They are curved, as shown, and are sprung slightly inward to clamp upon the hoof. Across the front of the hoof they are secured by the strap $d$, as shown.

It will be seen that the web is widened at the points of greatest bearing, the parts between such points being thin to make the supplemental shoe lighter, and thus save material as well as ease to the animal.

Having thus described my invention, what I claim is—

1. The supplemental horseshoe herein described, consisting of the crimp-like base formed with the rabbeted front portion and the calk-walls $e'\ e'$ and the web $b$, curving outwardly at its extremities and formed with the widened upper surfaces, $b'$ and $c'$, substantially as described.

2. The combination, with a supplemental horseshoe, C, constructed with the crimped base and the side wall or web, $b$, of the spring wire clamps $c\ c$ and strap $d$, substantially as described.

3. The combination, with a horseshoe, of a supplemental shoe formed with a rabbeted front portion, as at $a$, hook $g\ g'$, and side portions, $e'\ e'$, whereby the toe-calk is prevented from vertical and sidewise displacement, substantially as described.

In testimony that I claim the foregoing as my own I affix my signature in presence of two witnesses.

G. FRANK MESSINGER.

Witnesses:
 OWEN RADER,
 M. W. ARNER.